(12) United States Patent
Nonaka et al.

(10) Patent No.: US 11,578,639 B2
(45) Date of Patent: Feb. 14, 2023

(54) FAN SHROUD AND BLOWER DEVICE

(71) Applicant: MITSUBA Corporation, Gunma (JP)

(72) Inventors: Ryo Nonaka, Gunma (JP); Hidetake Ota, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 17/585,565

(22) Filed: Jan. 27, 2022

(65) Prior Publication Data

US 2022/0243640 A1 Aug. 4, 2022

(30) Foreign Application Priority Data

Feb. 3, 2021 (JP) .............................. JP2021-016086

(51) Int. Cl.
| | |
|---|---|
| *F01P 1/06* | (2006.01) |
| *F04D 29/54* | (2006.01) |
| *B60H 1/00* | (2006.01) |
| *F04D 19/00* | (2006.01) |
| *F01P 5/06* | (2006.01) |
| *F01P 5/04* | (2006.01) |

(52) U.S. Cl.
CPC ............ *F01P 1/06* (2013.01); *B60H 1/00464* (2013.01); *F01P 5/06* (2013.01); *F04D 19/002* (2013.01); *F04D 29/545* (2013.01); *F01P 2005/046* (2013.01)

(58) Field of Classification Search
CPC .......... F01P 1/06; F01P 2005/046; F01P 5/06; B60H 1/00464
See application file for complete search history.

(56) References Cited

U.S. PATENT DOCUMENTS

| | | | | |
|---|---|---|---|---|
| 6,106,228 | A * | 8/2000 | Bartlett | ................... F01P 11/10 123/41.11 |
| 6,123,051 | A * | 9/2000 | Kubina | ................... F28F 9/002 416/189 |
| 9,902,255 | B2 * | 2/2018 | Kim | ....................... B60K 11/02 |
| 10,480,394 | B2 * | 11/2019 | Shi | ............................ F01P 5/06 |
| 2002/0110462 | A1 * | 8/2002 | Hunt | ..................... F04D 29/582 417/366 |
| 2005/0217907 | A1 * | 10/2005 | Madson | ................... F01P 11/10 180/68.1 |
| 2006/0147304 | A1 * | 7/2006 | Cho | ...................... F04D 29/544 415/191 |
| 2008/0184523 | A1 * | 8/2008 | Yuasa | .................. F04D 29/703 15/412 |

(Continued)

FOREIGN PATENT DOCUMENTS

WO 2017170029 10/2017

*Primary Examiner* — Long T Tran

(74) *Attorney, Agent, or Firm* — JCIPRNET

(57) ABSTRACT

A fan shroud and a blower device are provided. The fan shroud includes a shroud wall surface and a plurality of ventilation openings. The shroud wall surface extends around a fan along a radial direction orthogonal to a rotation axis. The plurality of ventilation openings are formed through the shroud wall surface in a thickness direction of the shroud wall surface to allow passing of wind generated by a fan motor. A width of a wall surface side opening on a downstream side of the wind in the ventilation opening is smaller than a width of a lateral wall side opening on an upstream side of the wind in the ventilation opening.

8 Claims, 10 Drawing Sheets

(56) References Cited

U.S. PATENT DOCUMENTS

| | | | |
|---|---|---|---|
| 2009/0130968 A1* | 5/2009 | Harich | B60K 11/085 |
| | | | 156/60 |
| 2014/0086722 A1* | 3/2014 | Liedel | B60K 11/04 |
| | | | 415/4.1 |
| 2015/0118043 A1* | 4/2015 | Spaggiari | F04D 29/522 |
| | | | 415/220 |
| 2016/0229284 A1* | 8/2016 | Kim | B60K 11/08 |
| 2018/0066569 A1* | 3/2018 | Shi | F01P 11/10 |

* cited by examiner

FAN SHROUD AND BLOWER DEVICE

CROSS-REFERENCE TO RELATED APPLICATION

This application claims the priority benefit of Japan application serial no. 2021-016086, filed on Feb. 3, 2021. The entirety of the above-mentioned patent application is hereby incorporated by reference herein and made a part of this specification.

BACKGROUND

Technical Field

The disclosure relates to a fan shroud and a blower device.

Related Art

For example, a blower device is provided on a traveling direction rear side of a heat exchanger (e.g., a radiator) mounted on a vehicle to cool the heat exchanger. The blower device includes a fan motor, a fan attached to a shaft of the fan motor, and a fan shroud which covers around the fan. The fan shroud is fixed to the vehicle. The fan motor is fixed to the fan shroud. The fan may be an axial fan, for example.

In such a configuration, when the fan is rotated, air is drawn from a traveling direction front side of the heat exchanger by fan blades, and wind sequentially passes through the heat exchanger and the fan. By passing the wind through the heat exchanger in this manner, cooling of the heat exchanger is promoted.

Herein, in such a blower device, a wind speed at a position close to the shaft can be sufficiently ensured, but the wind speed decreases as the distance from the shaft increases in a radial direction. Further, when the vehicle is traveling, the fan shroud becomes a wall, and passing of traveling wind through the blower device is not desirable. For this reason, a technique of providing a passing permitting frame part in the fan shroud has been disclosed (see, for example, Patent Document 1: International Publication No. 2017/170029). The passing permitting frame part has an opening which allows passing of traveling wind and the like. Accordingly, it is possible to improve the passing of the traveling wind through the blower device. Further, when the fan is rotated, the wind speed at a position radially away from the shaft can be compensated.

In addition, the heat exchanger is often provided in a front part of an engine room of the vehicle. In other words, the wind sequentially passing through the heat exchanger and the blower device passes through the blower device and blows on the engine or the like in the engine room. If the wind reflected by the engine flows back and passes through the opening of the passing permitting frame part, air volume performance of the blower device may deteriorate.

SUMMARY

A fan shroud according to an embodiment of the disclosure is a fan shroud for fixing a fan motor with a fan attached to a shaft rotating on a rotation axis. The fan shroud includes a shroud wall surface and a plurality of ventilation openings. The shroud wall surface extends around the fan along a radial direction orthogonal to the rotation axis. The plurality of ventilation openings are formed through the shroud wall surface in a thickness direction of the shroud wall surface to allow passing of wind generated by the fan motor. An opening area on a downstream side of the wind in the ventilation opening is smaller than an opening area on an upstream side of the wind in the ventilation opening.

According to the disclosure, a pressure difference can be generated between the upstream side and the downstream side of the ventilation opening. In other words, a pressure on the downstream side of the ventilation opening is higher than a pressure on the upstream side of the ventilation opening. Therefore, it is possible to prevent the wind from flowing back through the ventilation opening. As a result, it is possible to ensure a wind speed at a position radially away from the shaft when the fan is rotated and prevent air volume performance from deteriorating while improving the passing of the traveling wind when the vehicle is traveling, for example.

DESCRIPTION OF THE EMBODIMENTS

An embodiment of the disclosure provides a fan shroud and a blower device capable of ensuring a wind speed at a position radially away from a shaft when a fan is rotated and preventing air volume performance from deteriorating while improving passing of traveling wind when a vehicle is traveling, for example. Hereinafter, the embodiment of the disclosure will be described with reference to the drawings.

Next, an embodiment of the disclosure will be described with reference to the drawings.

<Vehicle>

Figure 1:
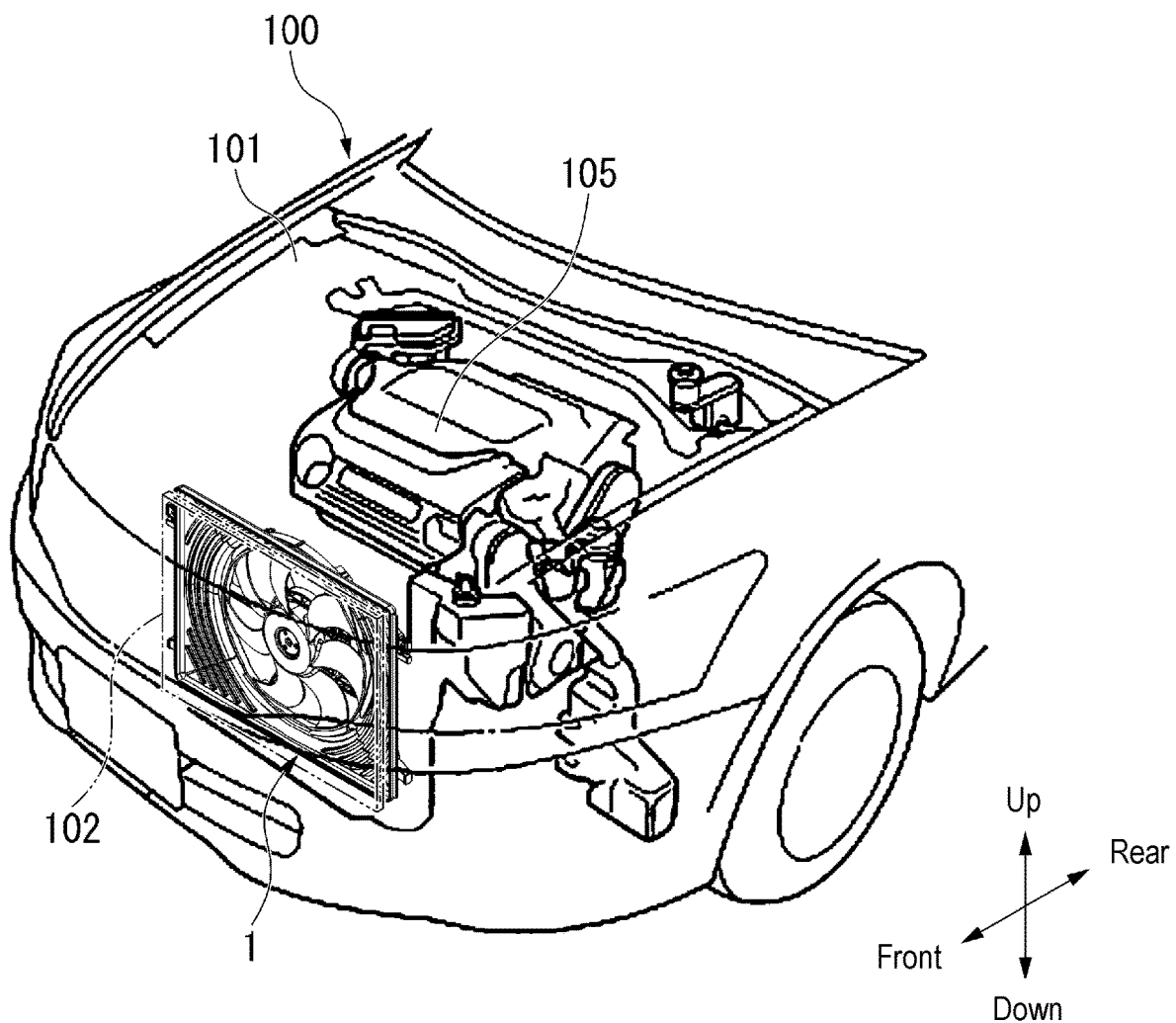
FIG. 1 is a perspective view showing a structure of an engine room of a vehicle according to an embodiment of the disclosure.

FIG. 1 is a perspective view showing a structure of an engine room 101 of a vehicle 100 provided with a blower device 1. In FIG. 1, to facilitate understanding of the description, a vehicle-mounted heat exchanger 102 is shown in a see-through state (double dot dash line).

The blower device 1 is used to cool the vehicle-mounted heat exchanger 102 such as a radiator and a condenser of the vehicle 100. In the following description, a traveling direction front side of the vehicle 100 will be simply referred to as a front side, a traveling direction rear side will be simply referred to as a rear side, a gravity direction upper side will be simply referred to as an upper side, and a gravity direction lower side will be simply referred to as a lower side. Further, in the following description, it will be assumed that a front side, a rear side, an upper side, and a lower side of the blower device 1 refer to directions of the posture at which the blower device 1 is attached to the vehicle 100.

As shown in FIG. 1, in the vehicle 100, an engine 105 is mounted in the engine room 101 on the front side of the vehicle interior, and the vehicle-mounted heat exchanger 102 is mounted on the front side of the engine 105. The blower device 1 is provided between the vehicle-mounted heat exchanger 102 and the engine 105 in a front-rear direction. The blower device 1 faces a ventilation surface (rear surface) of the vehicle-mounted heat exchanger 102 and circulates forced cooling air to the vehicle-mounted heat exchanger 102. In this embodiment, one blower device 1 is provided, but the number of blower devices 1 is not limited to one. For example, two blower devices 1 may be arranged side by side in a vehicle width direction.

<Blower Device>

Figure 2:
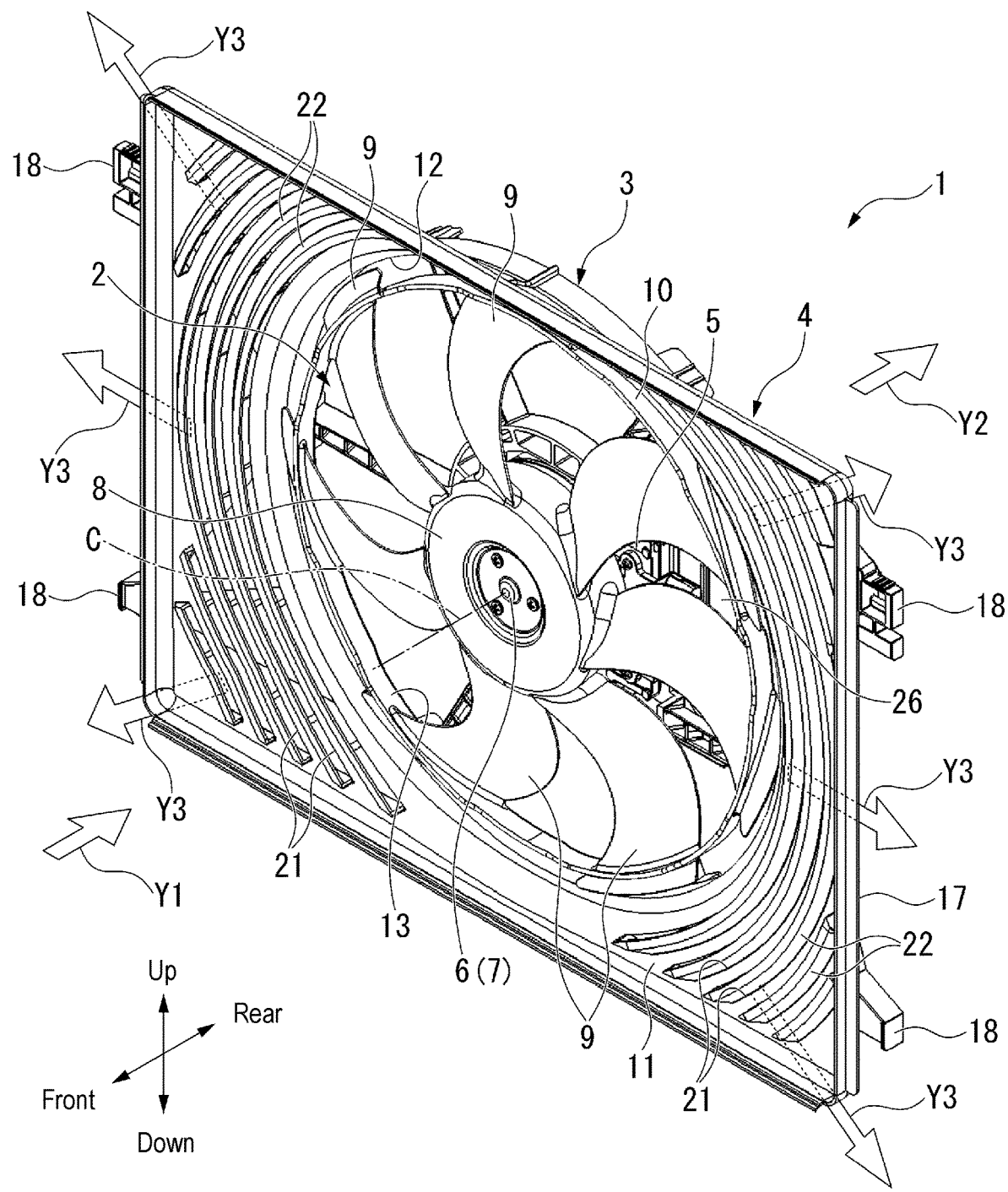
FIG. 2 is a perspective view of a blower device as viewed from a front side according to the embodiment of the disclosure.

FIG. 2 is a perspective view of the blower device 1 as viewed from the front side.

As shown in FIG. 2, the blower device 1 includes a fan motor 2 which is a driving source, a fan 3 which is rotationally driven by the fan motor 2, and a fan shroud 4 which forms an outer frame of the blower device 1 and is fixed to the vehicle-mounted heat exchanger 102. In the following description, a direction parallel to a rotation axis C of the fan motor 2 will be simply referred to as an axial direction, a rotation direction of the fan motor 2 will be referred to as a circumferential direction, a direction orthogonal to the axial direction and the circumferential direction will be referred to as a radial direction. The axial direction of the fan motor 2 coincides with the front-rear direction.

<Fan Motor>

The fan motor 2 includes a housing 5, a stator (not shown) housed in the housing 5, and a rotor 6 rotatably provided with respect to the stator. A shaft 7 of the rotor 6 protrudes from the housing 5. The fan 3 is attached to a tip of the protruding shaft 7.

The fan 3 is a so-called axial fan. By driving the fan motor 2, the fan 3 is rotated so as to suck air from the front side via the vehicle-mounted heat exchanger 102. The fan 3 includes a fan boss 8 in a bottomed cylindrical shape attached to the tip of the shaft 7, a plurality of (e.g., seven in this embodiment) fan blades 9 which are radially projected toward a radially outer side from an outer peripheral surface of the fan boss 8, and a ring part 10 in a cylindrical shape which is connected on the radially outer side of the plurality of fan blades 9 in an annular shape. The fan boss 8 is provided coaxially with the shaft 7. The fan boss 8 is opened toward the rear side, and a front end part of the housing 5 of the fan motor 2 is housed inside the fan boss 8. The ring part 10 is arranged coaxially with the shaft 7.

<Fan Shroud>

Figure 3:
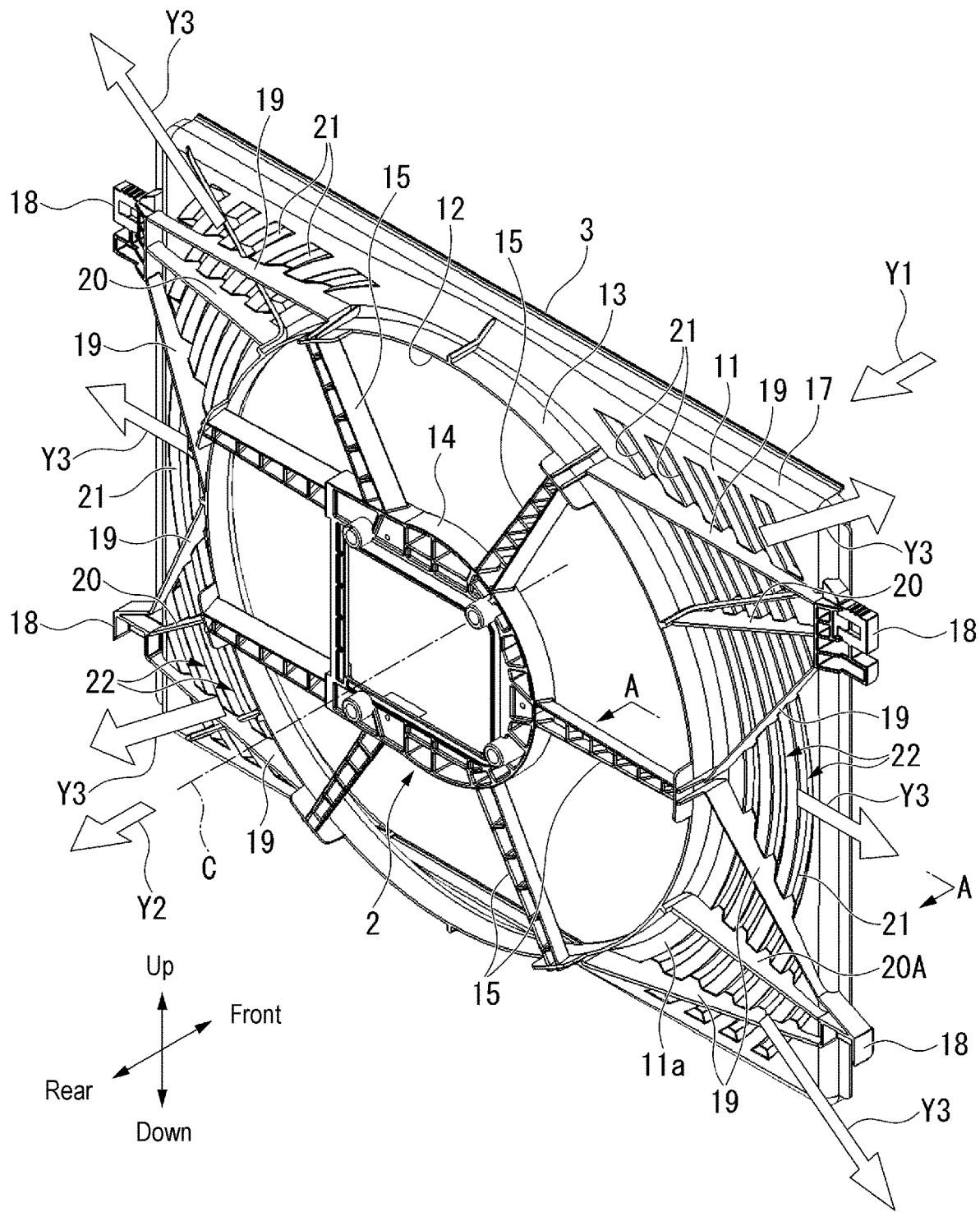
FIG. 3 is a perspective view of a fan shroud as viewed from a rear side according to the embodiment of the disclosure.

FIG. 3 is a perspective view of the fan shroud 4 as viewed from the rear side.

As shown in FIG. 3, the fan shroud 4 is formed of resin. The fan shroud 4 has a shroud wall surface 11 at the center of which the fan motor 2 and the fan 3 are arranged, and the shroud wall surface 11 surrounds the fan 3 from the radially outer side. The shroud wall surface 11 extends around the fan 3 along the vehicle width direction and the up-down direction.

More specifically, the shroud wall surface 11 is formed to spread like a skirt so as to be slightly inclined toward the front side (the vehicle-mounted heat exchanger 102 side) as it is positioned away from the fan 3. The outer shape of the shroud wall surface 11 when viewed from the front-rear direction is formed in a rectangular shape slightly longer in the vehicle width direction. The entire rear surface of the vehicle-mounted heat exchanger 102 is covered by the shroud wall surface 11. In other words, the shroud wall surface 11 corresponds to a wall plate that closes a space between a periphery of the fan 3 and the vehicle-mounted heat exchanger 102 by covering the entire rear surface of the vehicle-mounted heat exchanger 102.

An opening 12 formed at the center of the shroud wall surface 11 is circular when viewed from the axial direction (the front-rear direction). The ring part 13 in a cylindrical shape which rises toward the rear side is integrally formed on a peripheral edge of the opening 12. A motor mounting frame 14 in an annular shape when viewed from the axial direction is provided at a radial center of the ring part 13. The motor mounting frame 14 is supported by the ring part 13 via a plurality of stays 15.

The housing 5 of the fan motor 2 is fixed to the motor mounting frame 14. In this state, the shaft 7 of the fan motor 2 protrudes toward the rear side (the engine 105 side). Further, a heat shield plate 26 is attached to the motor mounting frame 14 on a bottom surface side of the housing 5. The heat shield plate 26 serves to shield heat for the fan motor 2 from the engine 105.

An outer frame 17 is integrally formed on an outer edge of the shroud wall surface 11 over the entire periphery. The outer frame 17 protrudes toward the front side (the vehicle-mounted heat exchanger 102 side) from the outer edge of the shroud wall surface 11. A mounting seat 18 is formed on the outer frame 17 to protrude toward a vehicle width direction outer side. Two mounting seats 18 are arranged on each of two outer sides of the outer frame 17 in the vehicle width direction. The mounting seat 18 serves to fix the fan shroud 4 to the vehicle-mounted heat exchanger 102.

A plurality of ribs 19 straddling between the mounting seat 18 and a portion of the ring part 13 at which the stay 15 is connected are integrally formed on a rear surface 11a of the shroud wall surface 11. Further, one auxiliary rib 20 is integrally formed in each region surrounded by the ribs 19 and the ring part 13 on the rear surface 11a of the shroud wall surface 11. The ribs 19 and the auxiliary ribs 20 serve to increase the mechanical strength of the shroud wall surface 11.

Figure 4:
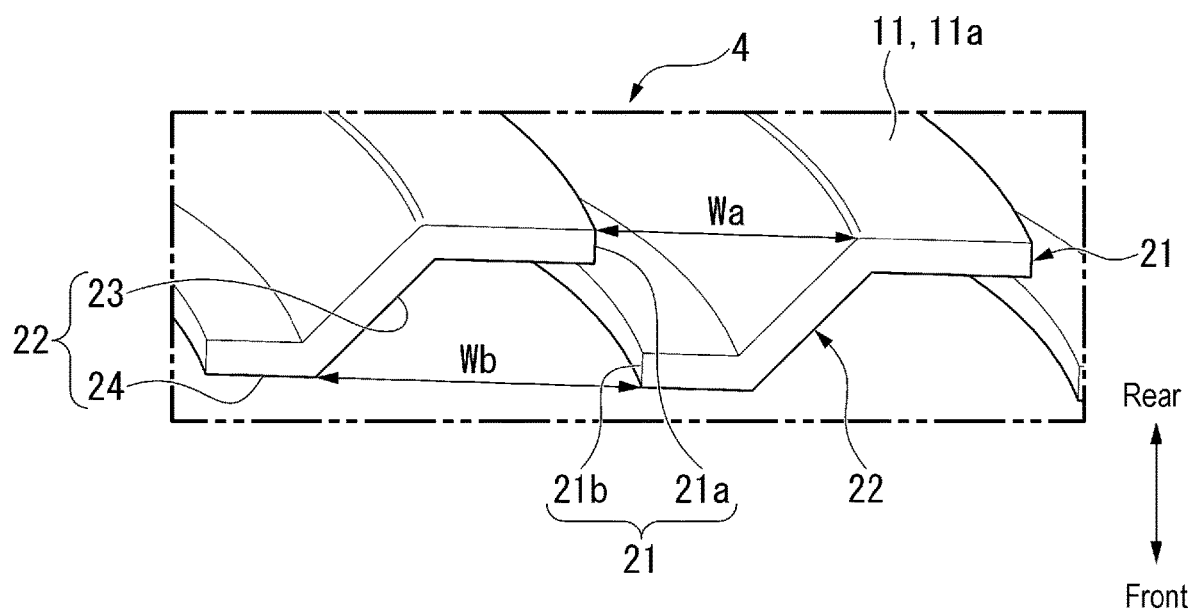
FIG. 4 is a cross-sectional view taken along line A-A of FIG. 3.
Figure 5:
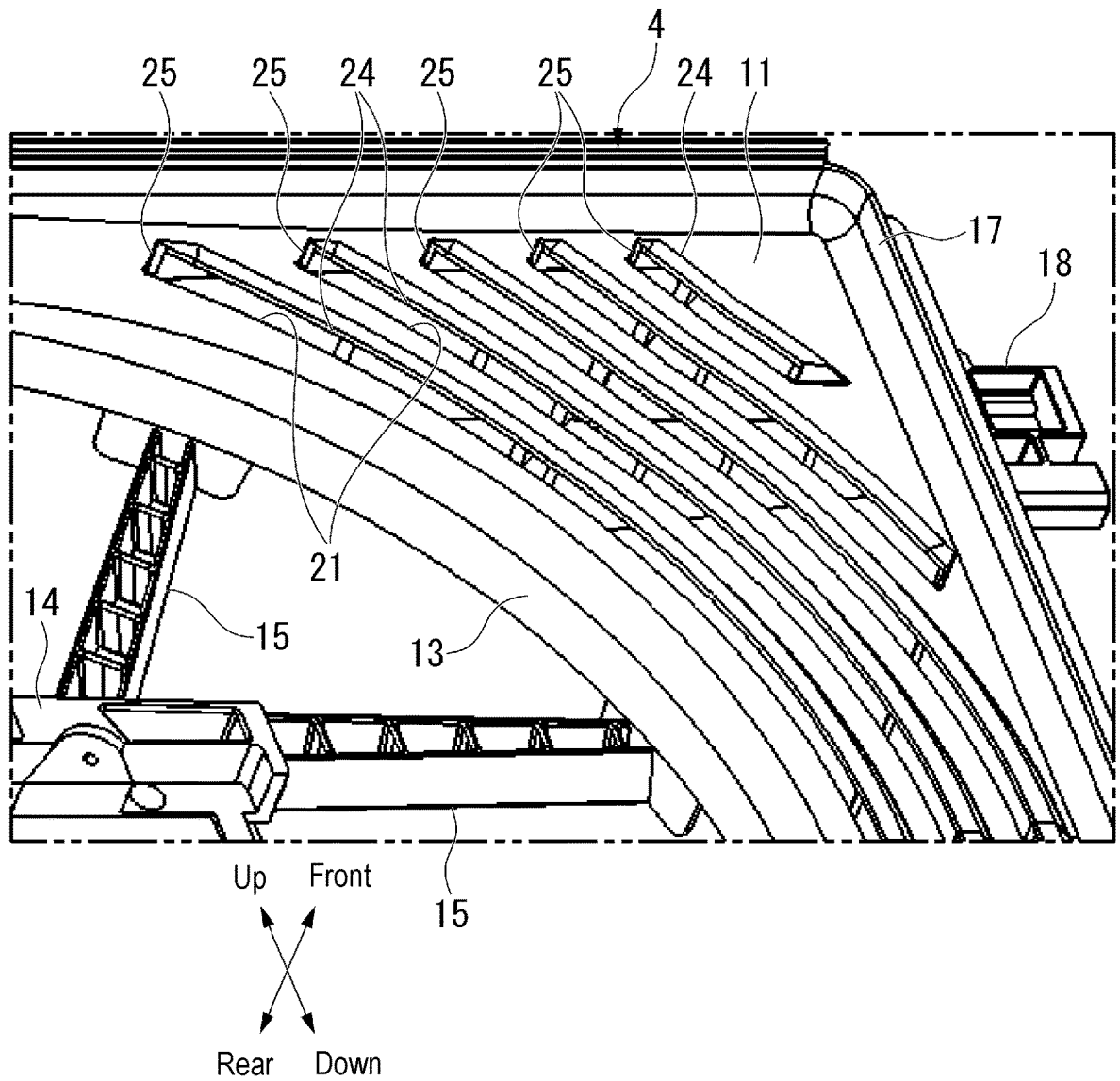
FIG. 5 is an enlarged perspective view of a part of a shroud wall surface as viewed from the front side according to the embodiment of the disclosure.

FIG. 4 is a cross-sectional view taken along line A-A of FIG. 3. FIG. 5 is an enlarged perspective view of a part of the shroud wall surface 11 as viewed from the front side.

As shown in FIG. 3 to FIG. 5, on the shroud wall surface 11, a plurality of ventilation openings 21 are formed to penetrate in a thickness direction of the shroud wall surface 11 on two sides in the vehicle width direction with the ring part 13 interposed therebetween. Further, each ventilation opening 21 is arranged concentrically with the ring part 13, and is formed in an arc shape when viewed from the axial direction (the front-rear direction) and in a long slit shape in the circumferential direction.

Of two side edges of each ventilation opening 21 in a short-side direction, a deflection louver 22 is integrally formed on the side edge of the ring part 13 side (radially inner side). The deflection louver 22 is formed in a shutter shape. In other words, the deflection louver 22 includes an inclined wall 23 protruding toward the front side (one side in a normal direction) from the shroud wall surface 11, a lateral wall 24 bent and extended toward a vehicle width direction inner side from a front end of the inclined wall 23, and a vertical wall 25 that closes a space between two ends of the lateral wall 24 in a long-side direction and the shroud wall surface 11.

The inclined wall 23 extends obliquely with respect to the normal direction of the shroud wall surface 11 (with respect to a plane direction) so as to gradually extend toward the vehicle width direction inner side from the shroud wall surface 11 toward the front side. The lateral wall 24 is substantially parallel to the shroud wall surface 11. The vertical wall 25 extends along the normal direction of the shroud wall surface 11.

With the deflection louver 22 provided, the ventilation opening 21 is composed of a wall surface side opening 21a formed facing the shroud wall surface 11 and a lateral wall side opening 21b formed between the lateral walls 24 adjacent to each other in the vehicle width direction (short-side direction of the lateral wall 24; short-side direction of the ventilation opening 21). The wall surface side opening 21a and the lateral wall side opening 21b are also arranged concentrically with the ring part 13 and are formed in an arc shape when viewed from the axial direction (the front-rear direction) and in a long slit shape in the circumferential direction.

Herein, when a width of the wall surface side opening 21a in the short-side direction is Wa and a width of the lateral wall side opening 21b in the short-side direction is Wb, the widths Wa and Wb satisfy:

$$Wa < Wb \quad (1).$$

<Effect of Fan Shroud>

Next, the effect of the fan shroud 4 will be described with reference to FIG. 2, FIG. 6, and FIG. 7.

Figure 6:
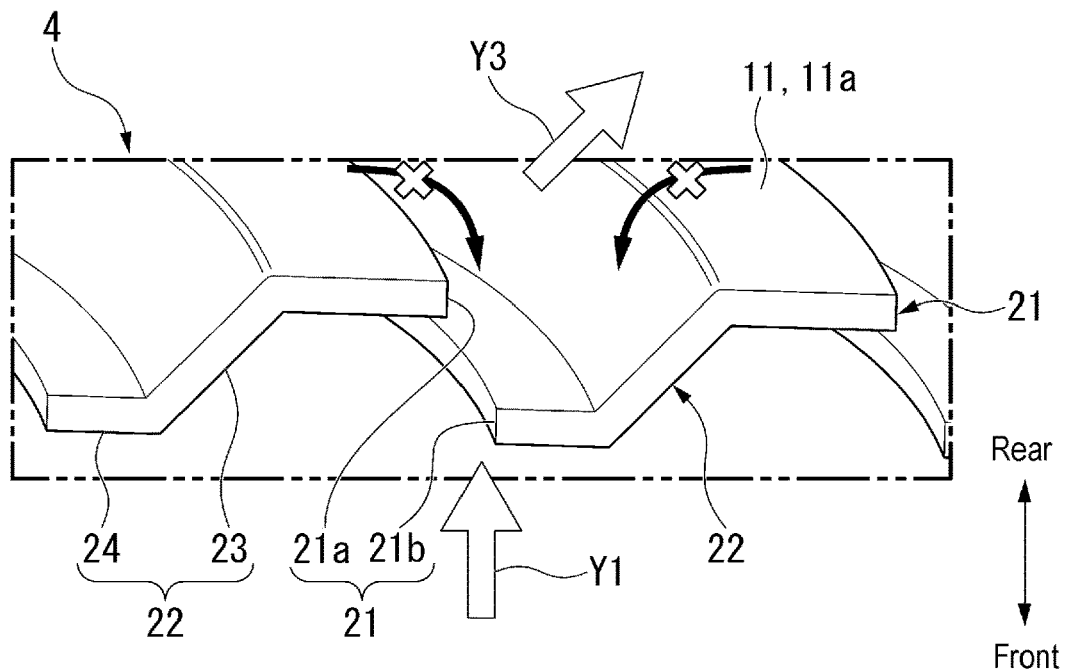
FIG. 6 is a view illustrating a flow of wind passing through a deflection louver according to the embodiment of the disclosure.

FIG. 6 is a view illustrating a flow of wind passing through the deflection louver 22 of the fan shroud 4. FIG. 6 corresponds to FIG. 4 described above.

As shown in FIG. 2 and FIG. 6, when the fan motor 2 is driven, the fan 3 is rotated so as to suck air from the front side via the vehicle-mounted heat exchanger 102 (see arrow Y1 in FIG. 2, FIG. 3, and FIG. 6). The wind passing through inside of the ring part 13 via the fan 3 flows to the engine room 101 (see FIG. 1) (see arrow Y2 in FIG. 2 and FIG. 3).

On the other hand, the wind sucked by the fan 3 also passes through the ventilation opening 21 of the shroud wall surface 11. At this time, the direction of the wind passing through the ventilation opening 21 is changed by the deflection louver 22. In other words, the deflection louver 22 includes the inclined wall 23 which gradually extends toward the vehicle width direction inner side from the shroud wall surface 11 toward the front side, and the lateral wall 24 which is bent and extended toward the vehicle width direction inner side from the front end of the inclined wall 23. Therefore, a flow path of wind is formed to gradually go toward the vehicle width direction outer side with respect to the front-rear direction as it goes toward a downstream side of the wind. Accordingly, the direction of wind passing through the ventilation opening 21 to the rear side is deflected to the vehicle width direction outer side (see arrow Y3 in FIG. 2, FIG. 3, and FIG. 6).

More specifically, the ventilation opening 21 and the deflection louver 22 are arranged concentrically with the ring part 13, and are formed in an arc shape when viewed from the axial direction (the front-rear direction) and in a long slit shape in the circumferential direction. Therefore, the direction of wind passing through the ventilation opening 21 to the rear side becomes a radial pattern spreading in the radial direction centered on the ring part 13.

Further, the ventilation opening 21 is composed of the wall surface side opening 21a formed facing the shroud wall surface 11 and the lateral wall side opening 21b formed on the front side of the shroud wall surface 11. Therefore, wind passes through the lateral wall side opening 21b and then passes through the wall surface side opening 21a to flow to the rear side (inside the engine room 101).

Herein, the width Wa of the wall surface side opening 21a in the short-side direction and the width Wb of the lateral wall side opening 21b in the short-side direction satisfy Formula (1) above. In other words, an opening area of the wall surface side opening 21a of the ventilation opening 21 located on the downstream side of wind is smaller than an opening area of the lateral wall side opening 21b of the ventilation opening 21 located on the upstream side of wind. As a result, a wind pressure at the wall surface side opening 21a (wind pressure on the downstream side of wind) is higher than a wind pressure at the lateral wall side opening 21b (wind pressure on the upstream side of wind).

In addition, the wind flowing through the blower device 1 to the rear side is reflected by components (e.g., the engine 105 or the like) in the engine room 101. Then, this wind is about to flow back to the front side through the ventilation opening 21. However, there is a pressure difference between the upstream side and the downstream side of the wind at the ventilation opening 21. In other words, in the ventilation opening 21, the wind pressure at the wall surface side opening 21a, which is on the downstream side of the wind in the ventilation opening 21, is higher than the wind pressure at the lateral wall side opening 21b, which is on the upstream side of the wind. Due to this pressure difference and the high wind pressure at the wall surface side opening 21a on the downstream side of the wind, backflow of wind through the ventilation opening 21 is prevented.

Figure 7:
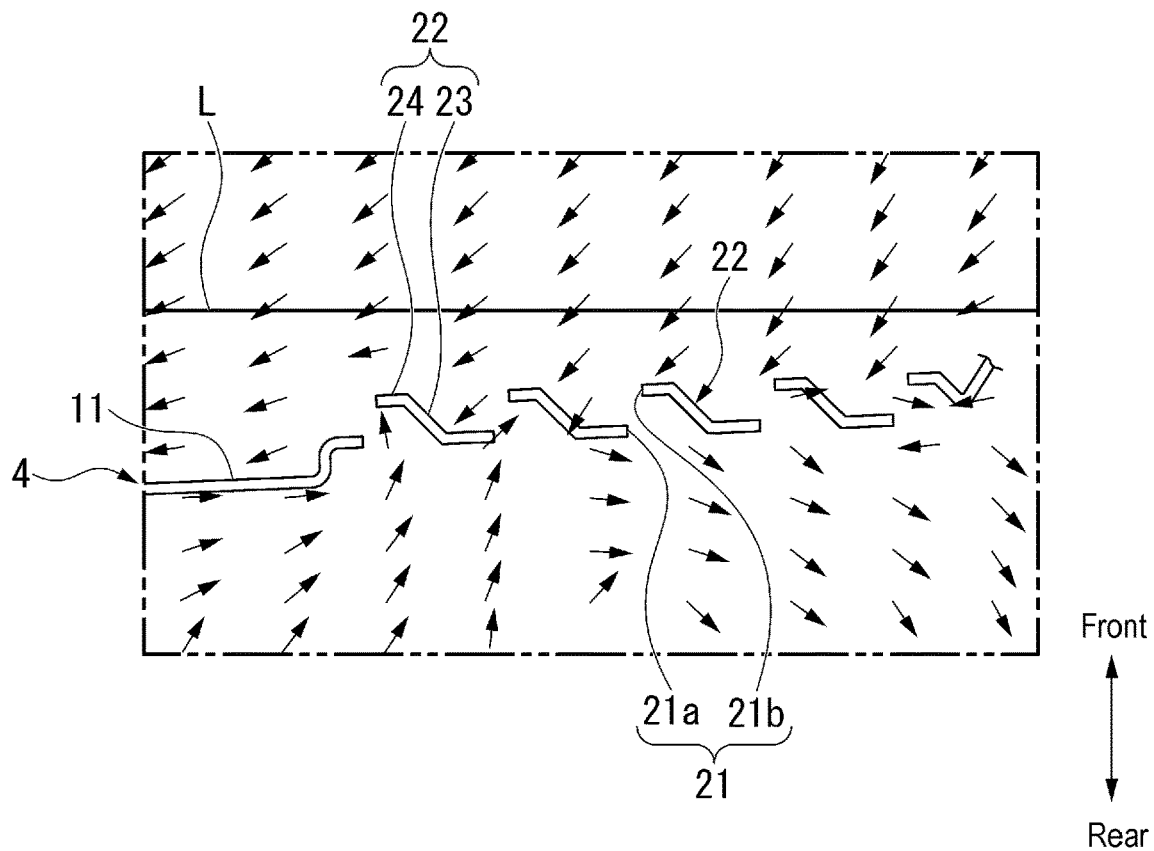
FIG. 7 is a view showing a simulation result of wind passing through a ventilation opening when a fan motor is driven according to the embodiment of the disclosure.

FIG. 7 is a view showing a simulation result of wind passing through the ventilation opening 21 when the fan motor 2 is driven. In FIG. 7, a line L corresponds to the rear surface of the vehicle-mounted heat exchanger 102. In other words, in FIG. 7, the upper part is the front side (the vehicle-mounted heat exchanger 102 side), and the lower part is the engine 105 side.

As shown in FIG. 7, it can be confirmed that backflow of wind through the ventilation opening 21 is prevented.

Further, when the vehicle 100 is traveling, since the ventilation opening 21 is formed on the shroud wall surface 11, the traveling wind smoothly passes from the front side to the rear side through the ventilation opening 21. At this time, due to the deflection louver 22, the direction of the wind passing through the ventilation opening 21 to the rear side turns to the vehicle width direction outer side. Therefore, it is possible to prevent the wind from blowing on the components in the engine room 101 that are not intended to be blown by the wind.

Figure 8:
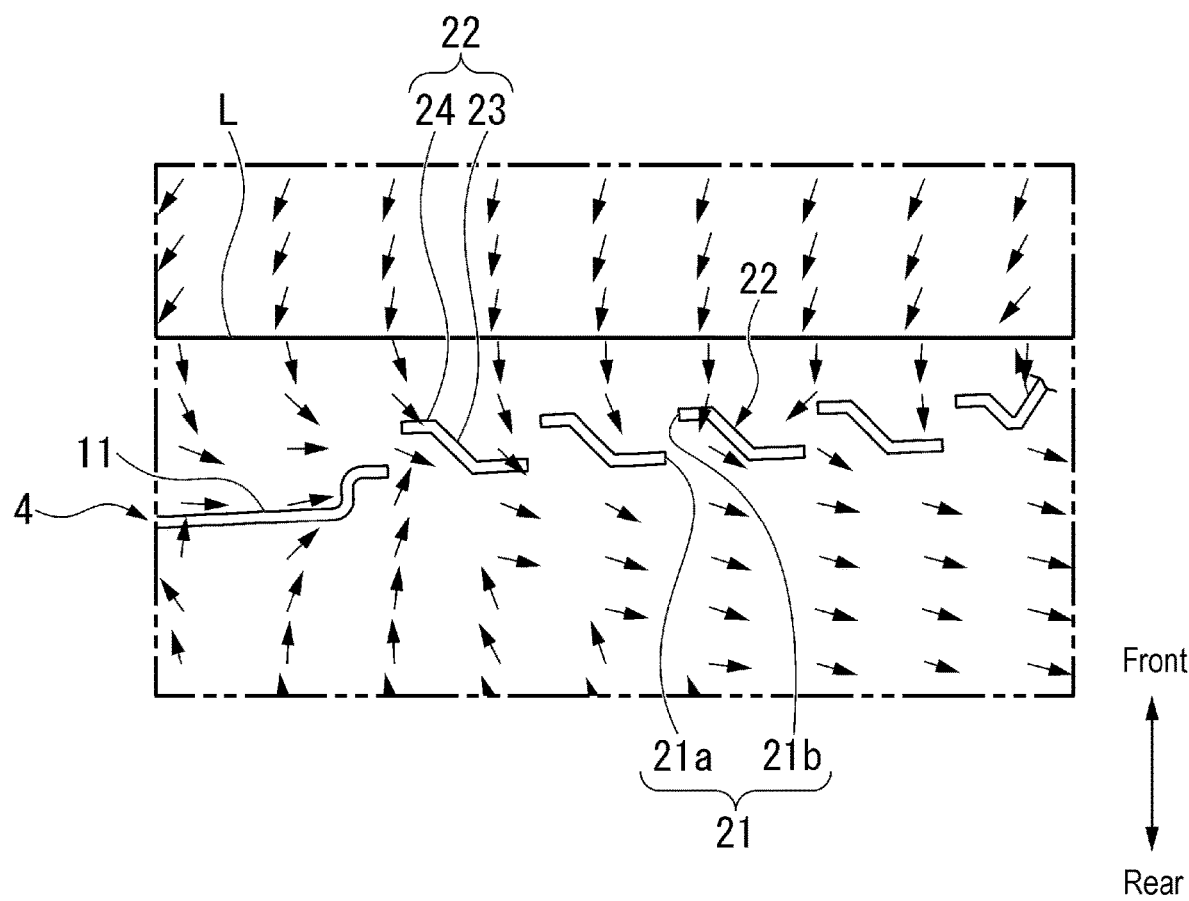
FIG. 8 is a view showing a simulation result of wind passing through the ventilation opening when a vehicle is traveling according to the embodiment of the disclosure.

FIG. 8 is a view showing a simulation result of wind passing through the ventilation opening 21 when the vehicle 100 is traveling. FIG. 8 corresponds to FIG. 7.

As shown in FIG. 8, when the vehicle 100 is traveling, it can be confirmed that the traveling wind smoothly passes from the front side to the rear side through the ventilation opening 21. Further, it can be confirmed that the traveling wind is prevented from blowing on the components in the engine room 101 and the wind is prevented from flowing back through the ventilation opening 21.

As described above, the fan shroud 4 in the above embodiment includes the shroud wall surface 11 extending around the fan 3 and the ventilation opening 21 formed through the shroud wall surface 11 in the thickness direction of the shroud wall surface 11. The opening area of the wall surface side opening 21a of the ventilation opening 21 located on the downstream side of wind is smaller than the opening area of the lateral wall side opening 21b of the ventilation opening 21 located on the upstream side of wind. Therefore, a pressure difference can be generated between the upstream side and the downstream side of wind in the ventilation opening 21. In other words, the pressure of the wall surface side opening 21a on the downstream side of wind in the ventilation opening 21 is higher than the pressure of the lateral wall side opening 21b on the upstream side of wind in the ventilation opening 21. Accordingly, it is possible to prevent wind from flowing back through the ventilation opening 21. As a result, the wind speed at a position radially away from the shaft 7 when the fan 3 is rotated is ensured, and it is possible to prevent air volume performance from deteriorating while improving the passing of the traveling wind when the vehicle 100 is traveling.

Further, of the two side edges of each ventilation opening 21 in the short-side direction, by integrally forming the deflection louver 22 on the side edge of the ring part 13 side (the radially inner side), the wall surface side opening 21a and the lateral wall side opening 21b are formed.

Then, the width Wa of the wall surface side opening 21a in the short-side direction and the width Wb of the lateral wall side opening 21b in the short-side direction satisfy Formula (1) above. Therefore, a pressure difference between the upstream side and the downstream side of wind in the ventilation opening 21 can be easily generated. Further, the deflection louver 22 may arbitrarily deflect the direction of the wind passing through the ventilation opening 21, and by utilizing this deflected wind, it is possible to control the cooling effect on the components (the engine 105, etc.) on the rear side of the blower device 1.

The deflection louver 22 includes the inclined wall 23 protruding from the shroud wall surface 11 toward the front side, the lateral wall 24 bent and extended toward the vehicle width direction inner side from the front end of the inclined wall 23, and the vertical wall 25 which closes a space between two ends of the lateral wall 24 in the long-side direction and the shroud wall surface 11. With such a deflection louver 22, it is possible to reliably form a flow path of wind which goes toward the vehicle width direction outer side with respect to the front-rear direction. Therefore, the direction of the wind passing through the ventilation opening 21 can be more reliably deflected by the deflection louver 22.

The inclined wall 23 protrudes toward the front side (one side in the normal direction) from the shroud wall surface 11. Therefore, on the upstream side of wind, the wind which is about to pass through the ventilation opening 21 is first blown on the inclined wall 23, and flows into the ventilation opening 21. Accordingly, the direction of the wind passing through the ventilation opening 21 can be reliably deflected.

Particularly, as in the above embodiment, in the blower device 1 provided between the vehicle-mounted heat exchanger 102 and the engine 105 in the front-rear direction, it is possible to reliably prevent the wind reflected by the engine 105 or the like from flowing back and passing through the ventilation opening 21. Therefore, it is possible to provide a blower device 1 capable of ensuring the wind speed at a position radially away from the shaft 7 when the fan 3 is rotated and preventing air volume performance from deteriorating while improving the passing of the traveling wind.

In the above embodiment, it has been described that the ventilation opening 21 is arranged concentrically with the ring part 13 and is formed in an arc shape when viewed from the axial direction (the front-rear direction) and in a long slit shape in the circumferential direction. However, the disclosure is not limited thereto, and various changes may be made to the shape of the ventilation opening 21. For example, modification examples will be described below.

First Modification Example

Figure 9:
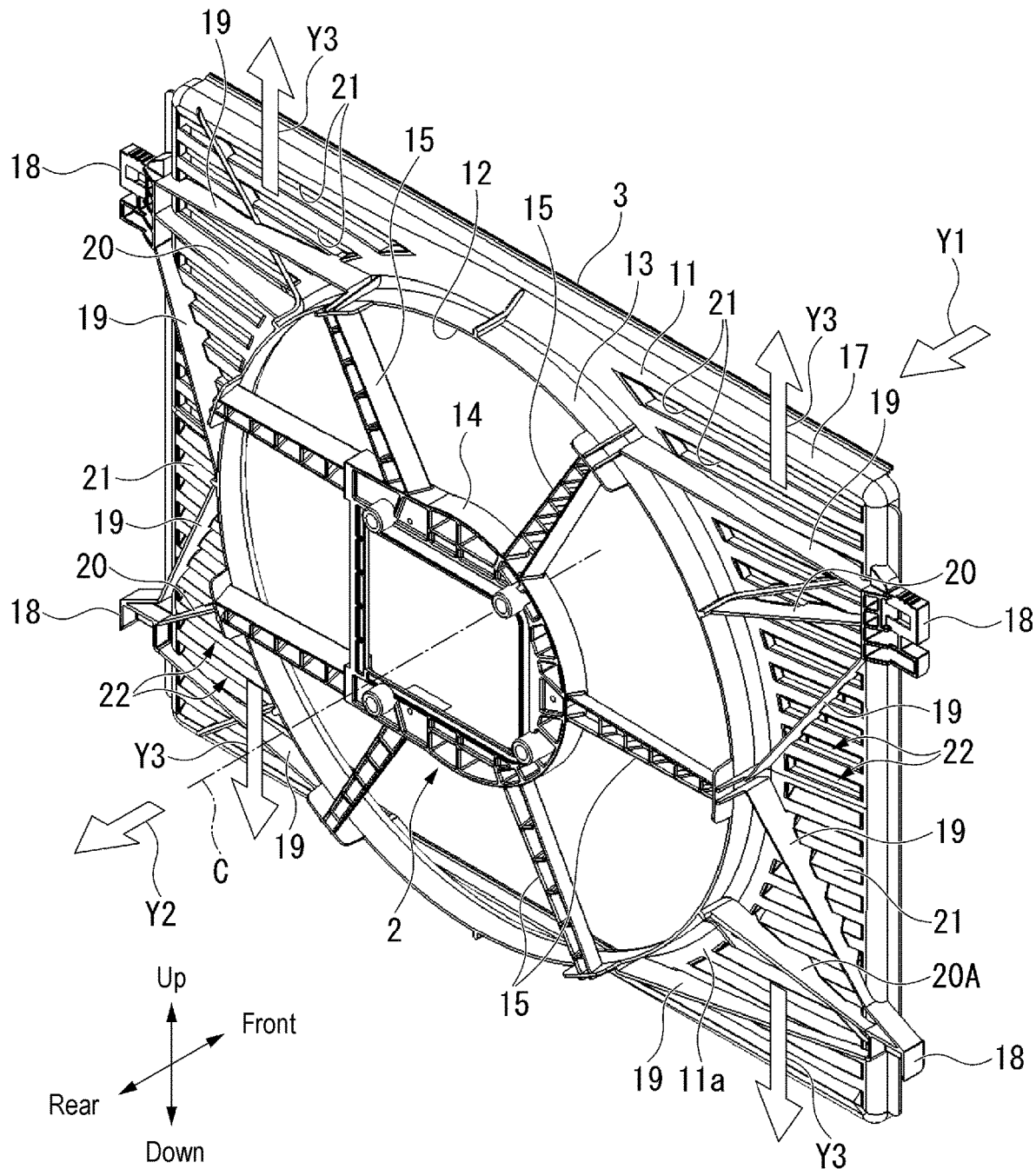
FIG. 9 is a perspective view of a fan shroud as viewed from the rear side according to a first modification example of the embodiment of the disclosure.

<Fan Shroud>
FIG. 9 is a perspective view of a fan shroud 4 in a first modification example as viewed from the rear side. FIG. 9 corresponds to FIG. 3 described above.

As shown in FIG. 9, a ventilation opening 21 may be formed in a long slit shape in the vehicle width direction. In this case, a plurality of ventilation openings 21 are arranged side by side in the up-down direction. Herein, a deflection louver 22 is formed in the ventilation openings 21 arranged in the upper half among the ventilation openings 21 so that the wind direction after passing through the ventilation opening 21 turns to an upward direction. On the other hand, a deflection louver 22 is formed in the ventilation openings 21 arranged in the lower half among the ventilation openings 21 so that the wind direction after passing through the ventilation opening 21 turns to a downward direction.

Even in the case of such a configuration, the same effects as those of the above embodiment can be obtained. Further, it is possible to increase the variation in the direction of the wind passing through the ventilation opening 21 due to the deflection louver 22.

Second Modification Example

Figure 10:
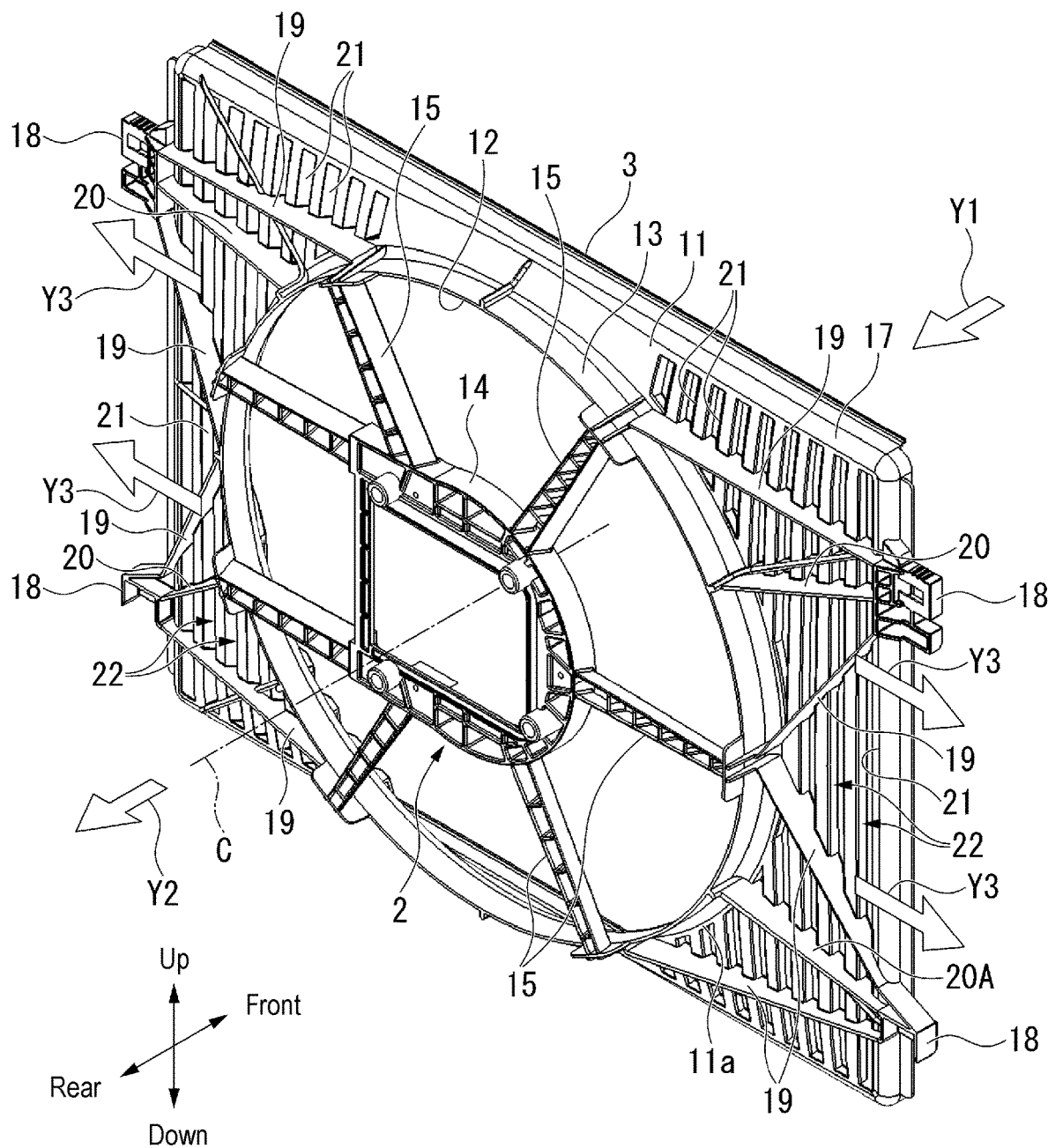
FIG. 10 is a perspective view of a fan shroud as viewed from the rear side according to a second modification example of the embodiment of the disclosure.

<Fan Shroud>
FIG. 10 is a perspective view of a fan shroud 4 in a second modification example as viewed from the rear side. FIG. 10 corresponds to FIG. 3 described above.

As shown in FIG. 10, a ventilation opening 21 may be formed in a long slit shape in the up-down direction. In this case, a plurality of ventilation openings 21 are arranged side by side in the vehicle width direction. In such a configuration, the wind after passing through the ventilation opening 21 goes toward the vehicle width direction outer side.

Therefore, according to the second modification example above, the same effects as those of the above embodiment can be obtained. Further, it is possible to increase the variation in the direction of the wind passing through the ventilation opening 21 due to the deflection louver 22.

Third Modification Example

Further, in the above embodiment, it has been described that the deflection louver 22 includes the inclined wall 23 protruding toward the front side (one side in the normal direction) from the shroud wall surface 11, the lateral wall 24 bent and extended toward the vehicle width direction inner side from the front end of the inclined wall 23, and the vertical wall 25 which closes a space between two ends of the lateral wall 24 in the long-side direction and the shroud wall surface 11. Furthermore, it has been described that the inclined wall 23 extends obliquely with respect to the normal direction of the shroud wall surface 11 (with respect to the plane direction) so as to gradually extend toward the vehicle width direction inner side from the shroud wall surface 11 toward the front side. However, the disclosure is not limited thereto, and the inclined wall 23 may protrude toward the rear side from the shroud wall surface 11.

In this case, the inclined wall 23 gradually extends toward the vehicle width direction outer side from the shroud wall surface 11 toward the rear side. Accordingly, the direction of the wind passing through the ventilation opening 21 to the rear side turns to the vehicle width direction outer side.

Further, in this case, in the ventilation opening 21, the wall surface side opening 21a is located on the upstream side of wind, and the lateral wall side opening 21b is located on the downstream side of wind. Therefore, a width Wa of the wall surface side opening 21a in the short-side direction and a width Wb of the lateral wall side opening 21b in the short-side direction satisfy:

$$Wa > Wb \qquad (2).$$

With such a configuration, it is possible to prevent backflow of wind through the ventilation opening 21.

Fourth Modification Example

Further, the deflection louver 22 may be formed as follows.

Figure 11:
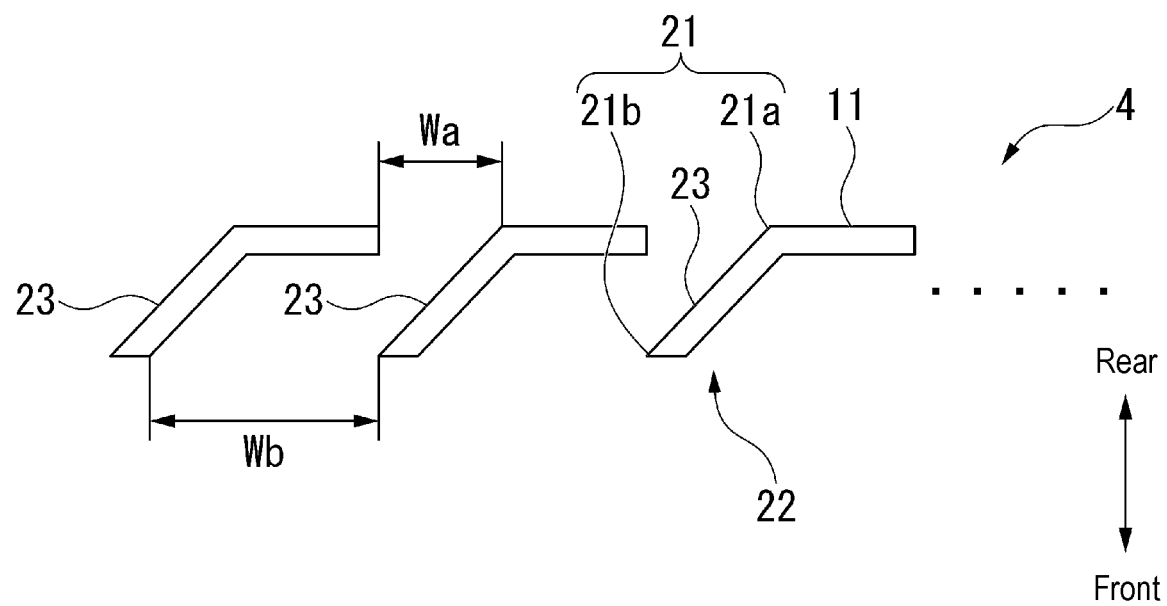
FIG. 11 is a cross-sectional view of a deflection louver taken along an axial direction according to a fourth modification example of the embodiment of the disclosure.

FIG. 11 is a cross-sectional view of a deflection louver 22 taken along an axial direction in a fourth modification example.

As shown in FIG. 11, the deflection louver 22 may be composed of the inclined wall 23 only. It is possible not to form the lateral wall 24 (see FIG. 4). Even with this configuration, with the width Wa of the wall surface side opening 21a in the short-side direction and the width Wb of the lateral wall side opening 21b in the short-side direction satisfying Formula (1) above, the same effects as those of the above embodiment can be obtained.

Fifth Modification Example

Figure 12:
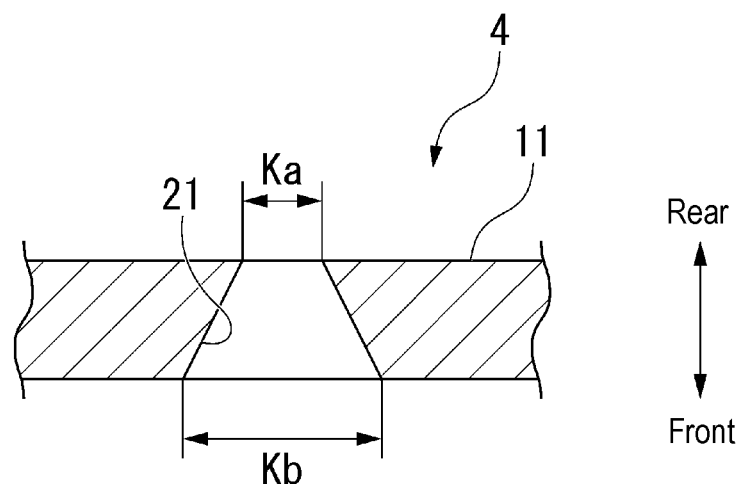
FIG. 12 is a partial cross-sectional view of a shroud wall surface according to a fifth modification example of the embodiment of the disclosure.

FIG. 12 is a partial cross-sectional view of a shroud wall surface 11 in a fifth modification example.

In the above embodiment, it has been described that the deflection louver 22 is integrally formed in the ventilation opening 21, and with the width Wa of the wall surface side opening 21a in the short-side direction and the width Wb of the lateral wall side opening 21b in the short-side direction satisfying Formula (1) above, the wind pressure on the downstream side of wind in the ventilation opening 21 is made higher than the wind pressure on the upstream side of wind.

However, the disclosure is not limited thereto, and as shown in FIG. 12, in a cross-section of the ventilation opening 21, an opening width Ka on the downstream side of wind may be made smaller than an opening width Kb on the upstream side of wind. With such a configuration, the same effects as those of the above embodiment can be obtained.

Sixth Modification Example

In the above embodiment, it has been described that the ventilation opening 21 is formed in a long slit shape in one direction (one of the circumferential direction, the up-down direction, and the vehicle width direction). However, the disclosure is not limited thereto, and the ventilation opening 21 may have various shapes. For example, the ventilation opening 21 may be formed in a circular shape when viewed from the front-rear direction (the axial direction), and a plurality of the ventilation openings 21 may be arranged on the shroud wall surface 11.

Even with this configuration, by making an opening area on the downstream side of wind in the ventilation opening 21 smaller than an opening area on the upstream side of wind as in the fifth modification example above, the same effects as those of the above embodiment can be obtained. The size of the opening area of the ventilation opening 21 is configured to be a size such that a pressure difference in the wind pressure is generated at the front and rear surfaces of the shroud wall surface 11.

In addition, the disclosure is not limited to the above embodiment and includes various modifications to the above embodiment without departing from the spirit of the disclosure.

For example, in the above embodiment, it has been described that the blower device 1 is used for cooling the vehicle-mounted heat exchanger 102 or the like of the vehicle 100. However, the disclosure is not limited thereto, and the blower device 1 may be used as various cooling devices.

What is claimed is:

1. A fan shroud for fixing a fan motor with a fan attached to a shaft rotating on a rotation axis, comprising:
    a shroud wall surface which extends around the fan along a radial direction orthogonal to the rotation axis; and
    a plurality of ventilation openings which are formed through the shroud wall surface in a thickness direction of the shroud wall surface to allow passing of wind generated by the fan motor,
    wherein each of the plurality of ventilation openings comprises a wall surface side opening formed on the shroud wall surface and a lateral wall side opening parallel to the wall surface side opening,
    wherein an opening area of the wall surface side opening on a downstream side of the wind is smaller than an opening area of the lateral wall side opening on an upstream side of the wind.

2. The fan shroud according to claim 1, wherein the ventilation opening is formed in a long slit shape in one direction when viewed from a direction of the rotation axis,
    the fan shroud has a deflection louver provided along a long-side direction of each of the plurality of ventilation openings when viewed from the direction of the rotation axis to guide the wind in a specified direction, and
    a distance between the deflection louvers adjacent to each other in a short-side direction of the ventilation opening has a width on the downstream side of the wind smaller than a width on the upstream side of the wind.

3. The fan shroud according to claim 2, wherein each of the deflection louvers comprises:
    an inclined wall which protrudes obliquely toward one side in a normal direction of the shroud wall surface and along a direction intersecting a plane direction of the shroud wall surface; and
    a lateral wall which protrudes from an end of the inclined wall opposite to the shroud wall surface respectively toward a same direction along the plane direction of the shroud wall surface, wherein the lateral wall side opening is formed between the lateral walls adjacent to each other, and in the short-side direction of the ventilation opening, of the wall surface side opening and the lateral wall side opening, a width of an opening located on the downstream side of the wind is smaller than a width of an opening located on the upstream side of the wind.

4. The fan shroud according to claim 3, wherein the inclined wall protrudes from the shroud wall surface toward the upstream side of the wind, and the width of the wall surface side opening is smaller than the width of the lateral wall side opening.

5. A blower device comprising:

the fan shroud according to claim 4, which is attached to a vehicle having a heat exchanger and an engine arranged on a rear side of the heat exchanger; and the fan motor fixed to the fan shroud, wherein the blower device cools the heat exchanger by the wind, and the fan shroud is arranged between the heat exchanger and the engine.

6. A blower device comprising:

the fan shroud according to claim 3, which is attached to a vehicle having a heat exchanger and an engine arranged on a rear side of the heat exchanger; and the fan motor fixed to the fan shroud, wherein the blower device cools the heat exchanger by the wind, and the fan shroud is arranged between the heat exchanger and the engine.

7. A blower device comprising:

the fan shroud according to claim 2, which is attached to a vehicle having a heat exchanger and an engine arranged on a rear side of the heat exchanger; and the fan motor fixed to the fan shroud, wherein the blower device cools the heat exchanger by the wind, and the fan shroud is arranged between the heat exchanger and the engine.

8. A blower device comprising:

the fan shroud according to claim 1, which is attached to a vehicle having a heat exchanger and an engine arranged on a rear side of the heat exchanger; and the fan motor fixed to the fan shroud, wherein the blower device cools the heat exchanger by the wind, and the fan shroud is arranged between the heat exchanger and the engine.

* * * * *